UNITED STATES PATENT OFFICE.

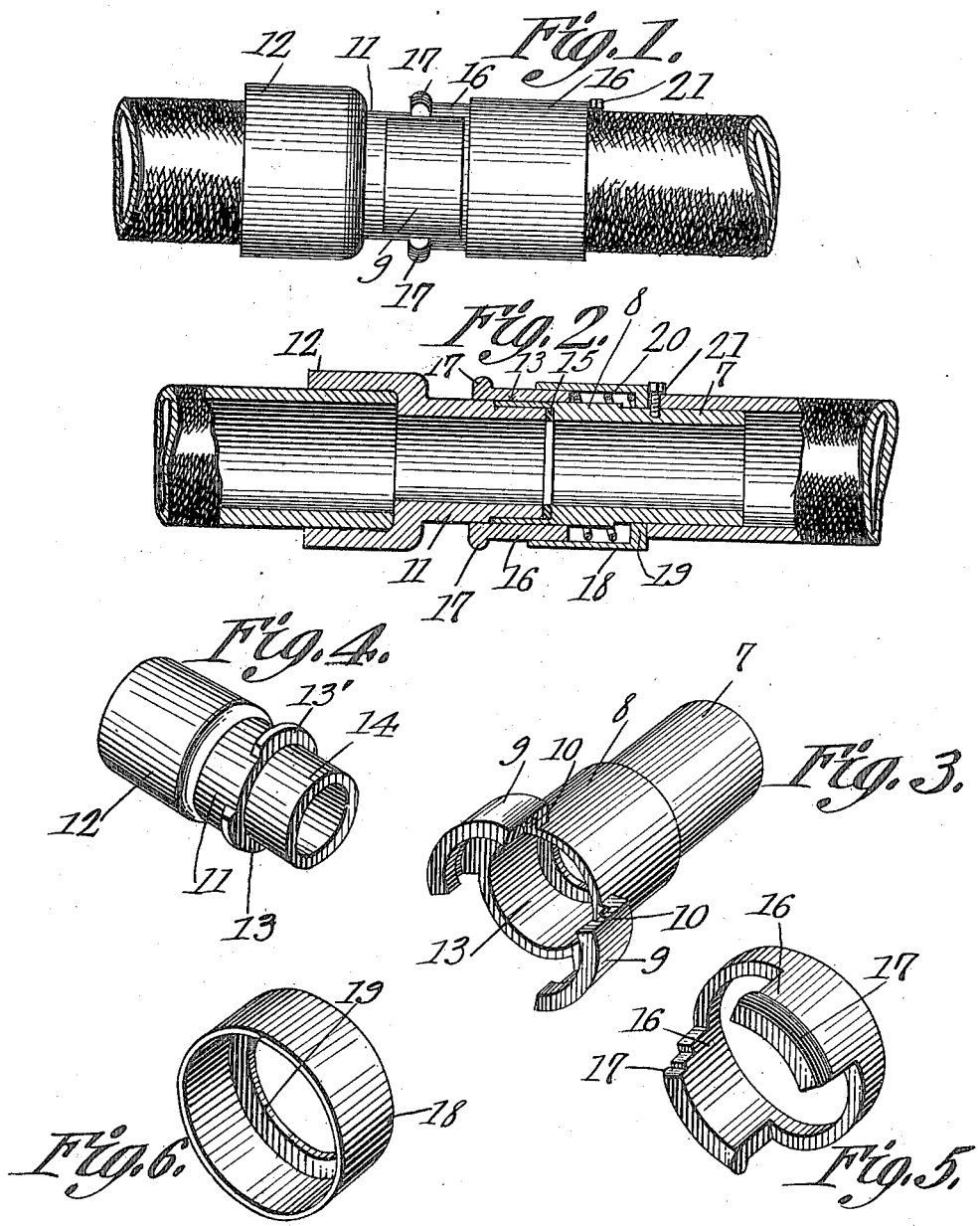

TILMAN WHITE, OF BERKELEY, CALIFORNIA, ASSIGNOR OF ONE-HALF TO ELI E. DRYDEN AND ONE-HALF TO THOMAS W. MORGAN, JR., OF OAKLAND, CALIFORNIA.

HOSE-COUPLING.

1,221,935.  Specification of Letters Patent.  Patented Apr. 10, 1917.

Application filed May 16, 1914, Serial No. 839,081. Renewed September 5, 1916. Serial No. 118,549.

*To all whom it may concern:*

Be it known that I, TILMAN WHITE, a citizen of the United States, residing at Berkeley, in the county of Alameda and State of California, have invented a new and useful Hose-Coupling, of which the following is a specification.

This invention relates to improvements in hose couplings.

An object of the present invention is to provide a coupling having novel means whereby the parts may be engaged and quickly detached.

A further object is to provide a coupling whose two parts may be readily snapped together and rotated through an arc to lock them together and when so rotated will be rigidly locked against reverse movement, thus preventing the accidental uncoupling or disengagement of the device.

Another object is to accomplish the aforementioned features in a simple and expeditious manner to thus provide a cheap and marketable article.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed without departing from the spirit of the invention.

In the drawings accompanying this specification and forming a part thereof, the preferred embodiment of my invention is illustrated, in which:—

Figure 1 is a side elevation of the improved coupling.

Fig. 2 is a longitudinal section of the assembled device.

Fig. 3 is a perspective view of the one section of the coupling.

Fig. 4 is a perspective view of the other section of the coupling.

Fig. 5 is a perspective view of the locking member.

Fig. 6 is a perspective view of the spring sleeve and guide for the locking member.

Referring to the drawings, in which similar reference numerals designate corresponding parts throughout the several views, one of the tubular mating sections, designated 8, has the hose attaching portion 7 at one end and a pair of diametrically opposite segmental or arcuate tongues 9 projecting from its other end. The tongues 9 project beyond the periphery of the section 8 and are provided with the inner transverse grooves 10 which are pitched at a slight angle in the manner of a screw thread, and lie outside of the periphery of the member 8.

The other tubular section 11 has the hose attaching portion 12 projecting from one end, a pair of opposite arcuate lips 13′ projecting from its periphery, and a nipple 14 projecting from its other end to enter the socket or counter bore 13 of the section 8. A gasket 15 is seated within the socket 13 for the engagement of the nipple 14 to provide for a liquid tight joint when the two sections are drawn together.

In order to prevent the accidental disengagement of the two sections of the coupling when they are assembled, a locking or latch ring 16 is mounted slidably upon the section 8, and has a pair of opposite arcuate tongues 17 projecting therefrom between the tongues 9.

In order to yieldably project the locking or latch ring 16, a sleeve or band 18 receiving the ring 16 surrounds the section 8, and is provided with an inturned flange 19 embracing the said section. A coiled wire expansion spring 20 is housed between the sleeve 18 and section 8, and one end of the spring rests against the flange 19, while the other end rests against the ring 16 to yieldably project the same. The flanged end of the sleeve 18 is secured to the section 8 by means of a set screw 21, to limit the movement of the sleeve 18.

When the sections or parts 8 and 11 are detached or separated, the locking ring 16 will be slid to projected position under the influence of the spring 20, whereby the tongues 17 of the ring 16 will be projected snugly between the tongues 9 of the tubular section 8. The tongues 17 fitting between the tongues 9, will hold the ring 16 against rotation, and will guide the ring for sliding movement. When the sections or members 8 and 11 are assembled, by a longitudinal movement, the nipple 14 will enter the socket 13 of the section 8, and the lips 13′ of the section 11 are adapted to pass between the tongues 9 of the section 8, whereby when the parts or sections are assembled, and rotated relative to one another, the lips 13′ will enter the grooves 10 of the tongues 9, to tightly bind the sections together, and hold them against longitudinal movement. When the lips 13' are forced between the tongues 9, the tongues 17 will be forced away from the grooves 10 to enable the lips 13' to register with and enter the slots or grooves 10, and then after the lips 13' have entered into the grooves or slots 10, the locking ring 16 will be snapped forwardly by the spring 20, to cause the tongues 17 of the locking ring to project between the grooves 10 of the tongues 9 for holding the lips 13' against disengagement from the tongues 9. The sections of the coupling are thus locked firmly together, to prevent accidental detachment.

The tongues 17 projecting from under the sleeve 18 between the tongues 9, are readily accessible, and may be conveniently pressed toward the sleeve 18 away from the grooves or slots 10, and which will enable the lips 13' to be swung out of engagement from the tongues 9 to enable the parts or sections to be separated readily.

Having thus fully described my invention, what I claim is:—

A hose coupling embodying a pair of mating tubular members, one having arcuate tongues projecting from one end, the tongues projecting from the periphery of the said member and having inner transverse grooves lying outside of the periphery of the said member; the other member having arcuate lips projecting from its periphery and adapted to pass between the said tongues when the members are assembled and to enter the said grooves when the members are rotated relative to one another, a sleeve surrounding and secured to the first mentioned member, a ring slidable upon the first mentioned member and received by the sleeve and having arcuate tongues projecting from under the sleeve between the aforesaid tongues to lock the said lips within the grooves, and a coiled wire spring housed between the sleeve and first mentioned member to project the ring, the ring being yieldable to retract the tongues from the said grooves.

In testimony that I claim the foregoing as my own, I have hereto affixed my signature in the presence of two witnesses.

TILMAN WHITE.

Witnesses:
ELI E. DRYDEN,
CHRISTINA A. MORGAN.

Copies of this patent may be obtained for five cents each, by addressing the "Commissioner of Patents, Washington, D. C."